Feb. 28, 1967     E. E. EATON ETAL     3,306,131
REVERSIBLE TORQUE CONVERTER
Filed Dec. 28, 1964     2 Sheets-Sheet 1
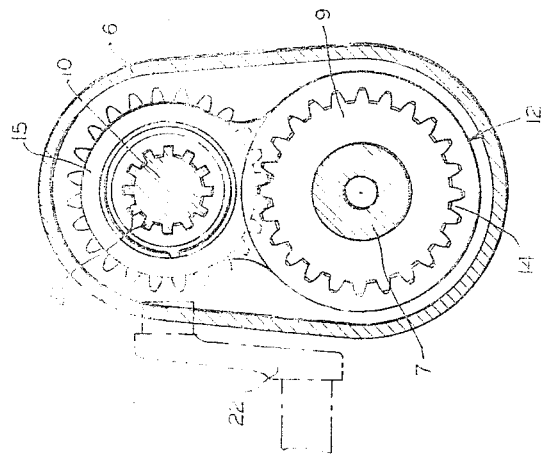
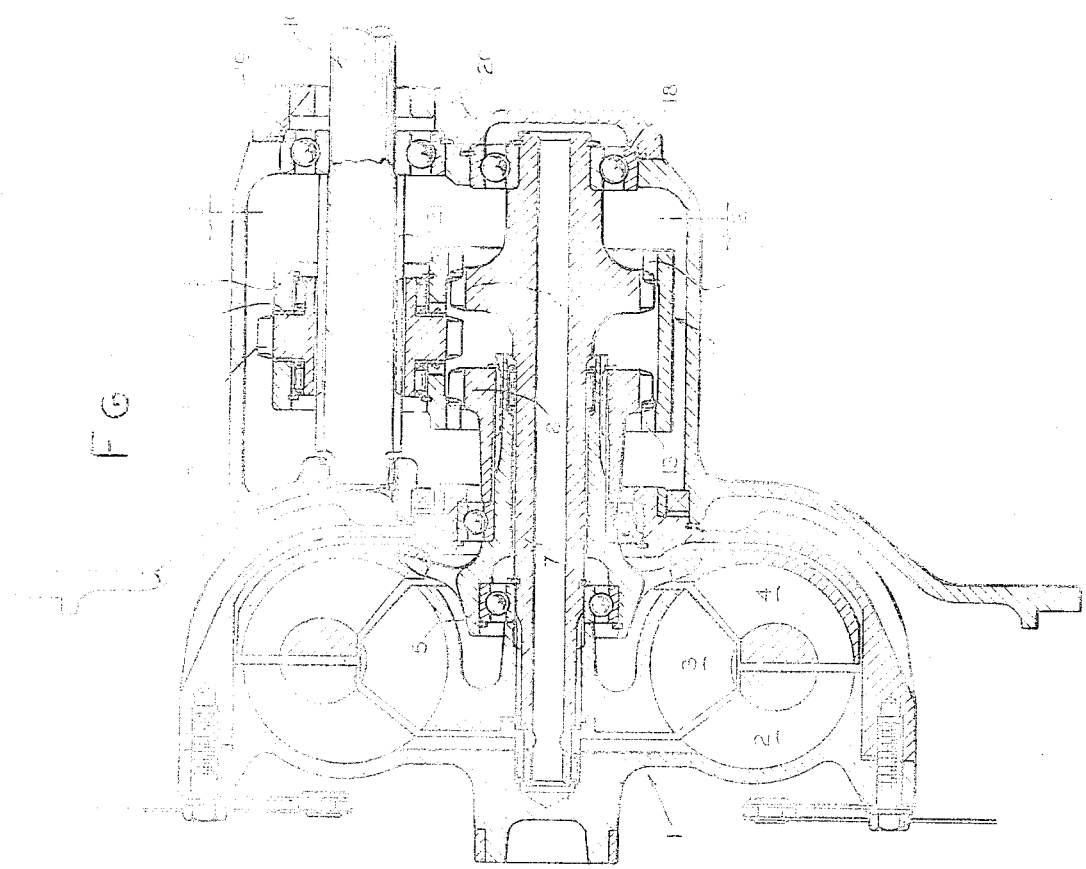
INVENTORS
ERNEST E. EATON

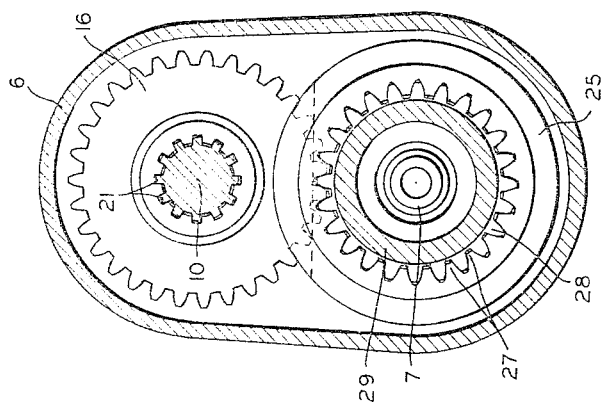
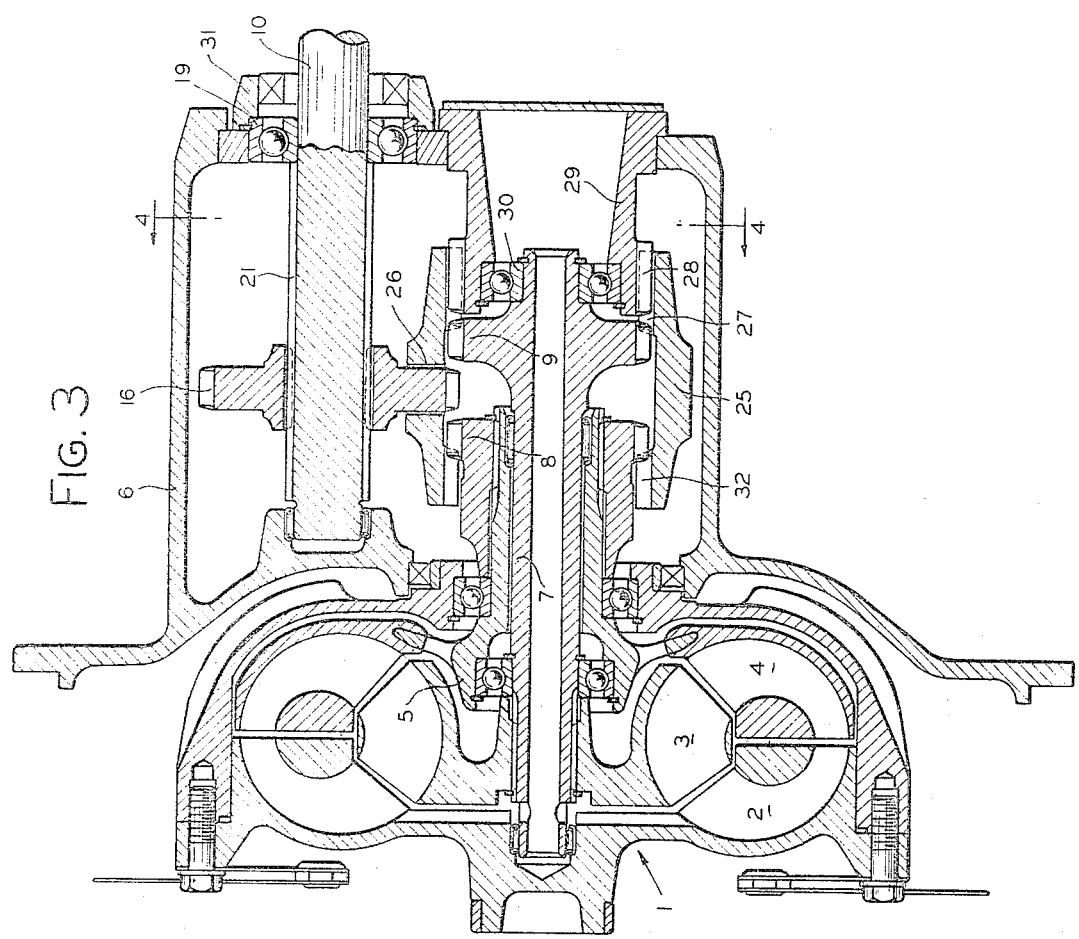

United States Patent Office 3,306,131
Patented Feb. 28, 1967

3,306,131
REVERSIBLE TORQUE CONVERTER
Ernest E. Eaton, Sun City, Ariz., and Barry L. Frost, Jackson, Mich., assignors to Clark Equipment Company, a corporation of Michigan
Filed Dec. 28, 1964, Ser. No. 421,312
7 Claims. (Cl. 74—718)

This invention relates to torque converters for use in automobiles and other automotive equipment.

It is known in torque converters to provide means whereby the turbine member may be connected to the output shaft while the stator member is held stationary, or vice versa, to provide a reversible drive. Our invention is directed to reversible drive means of the general type mentioned of improved form which provides compact and simplified reversing means which is positive in operation and assures that the driving elements are effectively locked in accurate adjustment. A further object of our invention is to provide parking brake means whereby the output shaft of the converter is locked against rotation. Further objects and advantages of our invention will appear from the detail description.

In the drawings:

FIGURE 1 is an axial sectional view of a torque converter embodying our invention, certain parts being shown in elevation;

FIGURE 2 is a sectional view taken substantially on line 2—2 of FIGURE 1;

FIGURE 3 is a view similiar to FIGURE 1 but showing a modified form of our invention; and FIGURE 4 is a sectional view taken substantially on line 4—4 of FIGURE 3.

We have illustrated our invention, by way of example, as applied to a torque converter which is, in general, of conventional type. It comprises a fluid filled chamber or casing 1 within which are disposed an impeller member 2, a stator member 3 and a turbine member 4. The turbine member 4 is secured on the inner end of a sleeve shaft 5, conveniently formed integral therewith, which is rotatably mounted in suitable bearings and extends outwardly beyond casing 1 into an adjacent housing 6. The stator member 3 is splined on the inner end of a second shaft 7 extending through the sleeve shaft 5 and beyond the ends thereof, with its outer end disposed within housing 6, shaft 7 being also mounted for rotation in suitable anti-friction bearings carried by shaft 5 and, at its outer end, in anti-friction bearings carried by the housing 6, shaft 7 being concentric with shaft 5. The latter shaft is provided, at its outer end, with a gear member 8 splined thereon and spaced from a gear member 9 secured on shaft 7, conveniently integral therewith. An output shaft 10 is rotatably mounted, by suitable bearings, in the housing 6 and extends through the outer end thereof.

A gear shift or adjusting sleeve 12 extends about the gears 8 and 9 concentrically therewith and is provided at its end portions with interior splines 13 and 14 disposed to mesh with the teeth of gears 8 and 9, under certain conditions, as will appear more fully later. The sleeve 12 is provided with an upward extension 15 extending about the output shaft 10 concentrically therewith, the sleeve 12 and extension 15 thereof together being of approximately figure eight shape, as shown more clearly in FIGURE 2. A third gear 16 is splined on output shaft 10, within housing 6, for adjustment lengthwise thereof and for imparting rotation thereto. The gear 16 is rotatably mounted in extension 15, by means of suitable bearings and extends through a slot 17 therein. As previously noted, the outer end of shaft 7 is rotatably mounted in bearings 18, and the output shaft 10 is also mounted in bearings 19, the latter and bearings 18 being accurately positioned by a cap plate 20 suitably secured, conveniently by bolting, to the outer end of housing 6. The bearings 19 cooperate with the splines 21 of output shaft 10 to restrain the latter against endwise movement and the bearings 18 cooperate with the shouldered outer end portion of shaft 17 to restrain that shaft against lengthwise movement, as will be understood.

When the gear 16 is in its neutral position shown in FIGURE 1, it is disposed substantially midway between the gears 8 and 9 with the splines 13 of sleeve 12 in mesh with gear 8 and the splines 14 at the outer end of sleeve 12 in mesh with gear 9, effective for locking the shafts 5 and 7 against rotation and thereby holding the turbine member 4 and the stator member 3 stationary. The gear shift member comprising sleeve 12 and extension 15 thereof is restrained against rotation due to its engagement with gears 8 or 9 and its extension about the output shaft 10 and gear 16, as will be understood. Accordingly, in the neutral position of gear 16 there is no transmission of power to the output shaft 10 which remains stationary. For forward drive the sleeve 12 is shifted toward the left, as viewed in FIGURE 1, until the splines 13 are clear of gear 8 with which gear 16 is then in mesh, the splines 14 at the outer end of sleeve 12 being then in mesh with gear 9. Under such conditions, the shaft 10 is then driven in forward direction by the turbine member 4 and shaft 7 is locked against rotation with the stator member remaining stationary. For reverse drive, the sleeve 12 is shifted toward the right, as viewed in FIGURE 1, moving the splines 14 clear of gear 9, with which gear 16 then meshes, and moving the splines 13 into mesh with gear 8. The latter gear is then locked against rotation and the shaft 10 is driven in reverse direction by the stator member 3, as will be understood. Splines 13 and 14 of the sleeve 12 are of such length that when gear 16 is in its neutral position splines 13 and 14 will be in mesh with gears 8 and 9 respectively, when gear 16 is in mesh with gear 8 splines 13 will be clear of the latter gear and splines 14 will be in mesh with gear 9, and when gear 16 is in mesh with gear 9 splines 14 will be clear of the latter gear and splines 13 will be in mesh with gear 8. The sleeve 12 may be adjusted by any suitable means, such as a shift lever arm 22 indicated in broken lines in FIGURE 2.

In the modified form of our invention shown in FIGURES 3 and 4, the gear 16 is shifted by means of a sleeve 25 extending around shafts 5 and 7 concentrically therewith. This sleeve is provided in its upper portion with a slot 26 receiving the lower portion of gear 16 and providing abutments at the opposite faces thereof for adjustment lengthwise of the output shaft 10. The sleeve 25 is provided at its outer end with interior splines 27 which mesh with the exterior splines 27 at the inner end of a tubular member or post 29 extending inwardly through the outer end of housing 6 and secured thereto in a suitable manner, conveniently by bolting. The shouldered outer end portion of shaft 7 is rotatably mounted in bearings 30 suitably mounted in the inner end of member or post 29. The bearings 19 of output shaft 10 are positioned by a cap member 31. The sleeve 25 is provided at its inner end with interior splines 32 disposed to mesh with gear 8.

When the gear 16 is in its neutral position shown in FIGURE 3, the splines 28 at the outer end of sleeve 25 are in mesh with gear 9 and with splines 28 of member 29, and the splines 32 at the inner end of sleeve 25 are in mesh with gear 8. The gears 8 and 9 are then locked against rotation and the turbine member 4 and the stator member 3 remain stationary. For forward drive the sleeve 25 is shifted toward the left, as viewed in FIGURE 3, thereby moving the splines 32 at the inner end of sleeve 25 out of mesh with gear 8 and bringing gear 16 into mesh with gear 8. The turbine member 4 is then effective for driving output shaft 10 in forward direction and the gear 9 is locked against rotation by the splines 27 at the outer end of sleeve 25 then in mesh with gear 9 and with splines 28 of member 29. For reverse drive sleeve 25 is shifted toward the right so as to mesh gear 16 with gear 9 while moving splines 27 at the outer end of sleeve 25 clear of gear 9 and moving splines 32 at the inner end of that sleeve into mesh with gear 8. The output shaft 10 is then driven in reverse direction by the stator member 3, the turbine member 4 being stationary. By shifting the sleeve 25 a further distance toward the right, the gear 16 is brought into mesh with splines 28 of member 29 while also remaining in mesh with gear 9, with the splines 32 at the inner end of sleeve 25 still in mesh with gear 8. In that manner the output shaft 10 is locked against rotation, with the shafts 5 and 7 also locked against rotation, providing a parking brake for an automobile or other automotive vehicle embodying the reversible torque converter of our invention.

It will be understood that changes in detail may be resorted to without departing from the field and scope of our invention, and we intend to include all such variations, as fall within the scope of the appended claims, in this application in which the preferred forms only of our invention have been disclosed.

We claim:

1. In a reversible torque converter, an impeller member, a first shaft and a second shaft, a turbine member and a stator member having driving connection to said first and said second shafts respectively, a first gear fixed on said first shaft, a second gear fixed on said second shaft, an output shaft, a third gear splined on said output shaft and adjustable therealong, and means for adjusting said third gear along said output shaft and into engagement with either of said first and second gears selectively and locking the other of said first and second gears against rotation.

2. In a reversible torque converter, an impeller member, a first shaft, a turbine member fixed on said first shaft, a second shaft, a stator member fixed on said second shaft, a first gear fixed on said first shaft, a second gear fixed on said second shaft, an output shaft, a third gear splined on said output shaft and adjustable therealong, and means for adjusting said third gear along said output shaft and into engagement with either of said first and second gears selectively and locking the other of said first and second gears against rotation.

3. In a reversible torque converter, an impeller member, a first shaft, a turbine member fixed on said first shaft, a second shaft, a stator member fixed on said second shaft, a first gear fixed on said first shaft, a second gear fixed on said second shaft, an output shaft, a third gear splined on said output shaft and adjustable therealong, said third gear having a neutral position extending between said first and second gears, and means for adjusting said third gear along said output shaft to said neutral position and locking said first and second gears against rotation and for adjusting said third gear from neutral position into engagement with either of said first and second gears selectively and locking the other thereof against rotation while releasing for rotation the engaged one of said first and second gears.

4. In a reversible torque converter, an impeller member, a first sleeve shaft, a turbine member fixed on said first shaft, a second shaft extending through and beyond said first shaft substantially concentric therewith, a stator member fixed on said second shaft, a first gear fixed on said first shaft, a second gear fixed on said second shaft and spaced from said first gear, an output shaft, a third gear splined on said output shaft and adjustable therealong, said third gear having a neutral position extending between said first and second gears, and means for adjusting said third gear along said output shaft to said neutral position and locking said first and second gears against rotation and for adjusting said third gear from neutral position into engagement with either of said first and second gears selectively and locking the other thereof against rotation while releasing for rotation the engaged one of said first and second gears.

5. In a reversible torque converter, a fluid receiving chamber, an impeller member in said chamber, a first sleeve shaft extending into said chamber, a second shaft extending through said first shaft substantially concentric therewith and beyond the ends thereof, a turbine member within said chamber fixed on the inner end of said first shaft, a stator member within said chamber fixed on the inner end of said second shaft, a first gear fixed on the outer end of said first shaft, a second gear fixed on the outer end of said second shaft and spaced outwardly from said first gear, an output shaft spaced from and parallel with said first and second shafts, a third gear splined on said output shaft and adjustable therealong, said third gear having a neutral position extending between said first and second gears, and means for adjusting said third gear along said output shaft to said neutral position and locking said first and second gears against rotation and for adjusting said third gear from neutral position into engagement with either of said first and second gears selectively and locking the other thereof against rotation while releasing for rotation the engaged one of said first and second gears.

6. In a reversible torque converter, a fluid receiving chamber, an impeller member in said chamber, a housing adjacent said chamber, a first sleeve shaft extending into said chamber and outwardly therefrom into said housing, a second shaft extending through said first shaft substantially concentric therewith and beyond the ends thereof, a turbine member within said chamber fixed on the inner end of said first shaft, a stator member within said chamber fixed on the inner end of said second shaft, a first gear fixed on the outer end of said first shaft, a second gear fixed on the outer end of said second shaft and spaced outwardly from said first gear, an output shaft rotatably mounted in said housing in spaced parallel relation to said first and second shafts, a third gear splined on said output shaft and adjustable therealong, said third gear having a neutral position extending between said first and second gears, a non-rotatable gear adjusting sleeve member adjustable lengthwise of said output shaft and having abutment elements at opposite sides of said third gear effective for adjusting the latter with said sleeve member to said neutral position and into engagement with said first and second gears selectively, said sleeve member having means cooperable with said first gear for locking the latter against rotation when said third gear is in either neutral position or engaged with said second gear and means for locking said second gear against rotation when said third gear is engaged with said first gear.

7. In a reversible torque converter, a fluid receiving chamber, an impeller member in said chamber, a housing adjacent said chamber, a first sleeve shaft extending into said chamber and outwardly therefrom into said housing, a second shaft extending through said first shaft substantially concentric therewith and beyond the ends thereof, a turbine member within said chamber fixed on the inner end of said first shaft, a stator member within said chamber fixed on the inner end of said second shaft, a first gear fixed on the outer end of said first shaft, a second gear fixed on the outer end of said second shaft and spaced outwardly from said first gear, an output shaft rotatably mounted in said housing in spaced parallel relation to said first and second shafts, a third gear splined on said output shaft and adjustable therealong, a fixed support on said housing adjacent the outer end of said second shaft substantially concentric therewith, said support having exterior splines, and an adjusting sleeve member slidable on said support having interior splines at its end portions and provided therebetween with an opening receiving a portion of said third gear and providing abutment elements at opposite sides thereof effective for adjusting said third gear with said sleeve member, said sleeve member being adjustable to an inner position in which said third gear is engaged with said first gear with the splines at the inner end of said sleeve member clear of said first gear and the splines at the outer end of said sleeve member engaged with said support and with said second gear locking it against rotation, an intermediate position with said third gear disposed between said first and second gears clear thereof and the splines at the ends of said sleeve member engaged with said first and second gears and said support locking said first and second gears against rotation, and an outer position with the splines at the inner end of said sleeve member engaged with said first gear and said third gear engaged with said second gear and said support and the splines at the outer end of said sleeve engaged with said support whereby all of said gears and said output shaft are locked against rotation.

References Cited by the Examiner

UNITED STATES PATENTS

| | | | |
|---|---|---|---|
| 1,368,822 | 2/1921 | Michael | 192—4 |
| 1,923,995 | 8/1933 | Nock | 192—4 |
| 2,158,557 | 5/1939 | Lammeren | 74—677 |
| 2,456,328 | 12/1948 | Schneider | 74—677 |
| 2,695,533 | 11/1954 | Pollard | 74—732 |

DAVID J. WILLIAMOWSKY, *Primary Examiner.*

T. C. PERRY, *Assistant Examiner.*